(12) United States Patent
Zhu et al.

(10) Patent No.: US 10,003,471 B2
(45) Date of Patent: Jun. 19, 2018

(54) REMOTE CONTROL METHOD FOR MULTI-TERMINAL DEVICE, AND RELATED APPARATUS AND SYSTEM

(71) Applicants: SHENZHEN SKYWORTH DIGITAL TECHNOLOGY CO., LTD, Shenzhen (CN); SHENZHEN SKYWORTH SOFTWARE CO., LTD, Shenzhen (CN)

(72) Inventors: Jianwen Zhu, Shenzhen (CN); Kaichao Wang, Shenzhen (CN)

(73) Assignees: SHENZHEN SKYWORTH DIGITAL TECHNOLOGY CO., LTD, Shenzhen (CN); SHENZHEN SKYWORTH SOFTWARE CO., LTD, Shenzhen (CN)

( * ) Notice: Subject to any disclaimer, the term of this patent is extended or adjusted under 35 U.S.C. 154(b) by 4 days.

(21) Appl. No.: 15/505,868

(22) PCT Filed: Mar. 5, 2015

(86) PCT No.: PCT/CN2015/073705
§ 371 (c)(1),
(2) Date: Feb. 22, 2017

(87) PCT Pub. No.: WO2016/026284
PCT Pub. Date: Feb. 25, 2016

(65) Prior Publication Data
US 2017/0272266 A1    Sep. 21, 2017

(30) Foreign Application Priority Data
Aug. 22, 2014  (CN) .......................... 2014 1 0419270

(51) Int. Cl.
| G05B 11/01 | (2006.01) |
| H04L 12/28 | (2006.01) |
| H01H 9/02 | (2006.01) |

(52) U.S. Cl.
CPC ........ H04L 12/2807 (2013.01); H04L 12/282 (2013.01); *G08C 2201/20* (2013.01); *G08C 2201/92* (2013.01); *H01H 9/0235* (2013.01)

(58) Field of Classification Search
CPC .............. H04L 12/2807; H04L 12/282; G08C 2201/20; G08C 2201/92; H01H 9/0235
(Continued)

(56) References Cited

U.S. PATENT DOCUMENTS 6,938,101 B2 *  8/2005  Hayes ................... G06F 1/1626
                                                348/E5.103
7,589,642 B1 *  9/2009  Mui ....................... G08C 17/00
                                                    340/12.3
(Continued)

FOREIGN PATENT DOCUMENTS

CN           1589585 A      3/2005
CN         101034493 A      9/2007
(Continued)

*Primary Examiner* — Zhen Y Wu
(74) *Attorney, Agent, or Firm* — Shimokaji IP

(57) ABSTRACT

Disclosed are a remote control method for multi-terminal device, and a related apparatus and system. The method comprises: receiving, by a user terminal, a first switching instruction sent by a main remote controller via a forwarding device; responding to the first switching instruction, and displaying an identifier of a first slave remote controller pre-added to a remote controller list; and sending key value information about the first slave remote controller stored in a database to the main remote controller via the forwarding device, so that the main remote controller refreshes the key value information about the key layout of the main remote controller according to the key value information about the (Continued)

first slave remote controller, and performs a remote control operation on a terminal device corresponding to the first slave remote controller.

20 Claims, 8 Drawing Sheets

(58) Field of Classification Search
USPC .................................................... 340/12.22
See application file for complete search history.

(56) References Cited

U.S. PATENT DOCUMENTS

| | | | | |
|---|---|---|---|---|
| 9,020,968 | B2* | 4/2015 | Lim | G08C 19/28 |
| | | | | 707/769 |
| 9,071,329 | B2* | 6/2015 | Escobosa | G06F 8/65 |
| 9,398,242 | B2* | 7/2016 | Kohanek | G08C 19/28 |
| 9,412,261 | B2* | 8/2016 | Huang | G08C 17/02 |
| 9,843,831 | B2* | 12/2017 | Mangla | H04N 21/42204 |
| 2004/0070491 | A1* | 4/2004 | Huang | G08C 17/02 |
| | | | | 340/10.5 |
| 2004/0075642 | A1* | 4/2004 | Kisliakov | G06F 1/1626 |
| | | | | 345/156 |
| 2007/0052549 | A1* | 3/2007 | Le | G08C 17/00 |
| | | | | 340/13.24 |
| 2007/0271267 | A1* | 11/2007 | Lim | G08C 19/28 |
| 2009/0231178 | A1* | 9/2009 | Letourneur | G08C 17/02 |
| | | | | 341/176 |
| 2010/0223549 | A1* | 9/2010 | Edwards | H04N 5/4403 |
| | | | | 715/708 |
| 2011/0298581 | A1* | 12/2011 | Hsu | H04N 21/42208 |
| | | | | 340/4.3 |
| 2012/0295662 | A1* | 11/2012 | Haubrich | H04M 1/72533 |
| | | | | 455/556.1 |
| 2014/0153927 | A1* | 6/2014 | Langer | G08C 17/02 |
| | | | | 398/106 |
| 2018/0040238 | A1* | 2/2018 | Haughawout | H04N 21/6125 |

FOREIGN PATENT DOCUMENTS

| | | |
|---|---|---|
| CN | 102098461 A | 6/2011 |
| CN | 102710979 A | 10/2012 |
| CN | 103176446 A | 6/2013 |
| CN | 104244054 A | 12/2014 |

* cited by examiner

REMOTE CONTROL METHOD FOR MULTI-TERMINAL DEVICE, AND RELATED APPARATUS AND SYSTEM

This application claims priority to Chinese Patent Application of Application No. 201410419270.6, filed on 2014 Aug. 22 and entitled "REMOTE CONTROL METHOD FOR MULTI-TERMINAL DEVICE, AND RELATED APPARATUS AND SYSTEM", the entire contents of which are incorporated herein by reference.

TECHNICAL FIELD

The disclosure relates to the technical field of remote control, and more particularly to a remote control method, related device, and system for multiple terminal devices.

BACKGROUND

Along with development of intelligent home appliances, each family has increasingly rich electronic devices. For example, a family can have a television set, a Set Top Box (STB), an air conditioner, a Digital Video Disk (DVD) player, a stereo, and the like. Each device has a remote controller matched therewith, and devices of different model numbers or different types follow different infrared remote control manners, so that remote controllers of multiple devices cannot be shared. Every time when a user wants to operate different devices, plenty of time and energy is wasted for looking for corresponding remote controllers. For solving this condition, a universal remote controller capable of controlling all devices in a family emerges.

Generally, the working principle of a common universal remote controller is to learn and store different infrared remote control codes and then restore and transmit the same, thereby realizing the function of controlling multiple devices through one remote controller. Although the universal remote controller can control multiple devices, a user is required to learn remote controllers for different devices one by one before use, that is, the user is required to align the remote controllers for the devices with a light emitting/receiving head of the universal remote controller, press function keys on the remote controllers for the devices and then press keys on the universal remote controller for learning. In such a manner, the whole learning process is complex and time-consuming, and in addition, it is difficult for the aged and children to master the learning process.

SUMMARY

Embodiments of the disclosure provide a remote control method, related device, and system for multiple terminal devices, which can simply and conveniently control the multiple terminal devices through one remote controller.

A first aspect of the embodiments of the disclosure provides a remote control method for multiple terminal devices, which includes the follows:

a user terminal receives a first switch instruction sent by a main remote controller through a forwarding device;

the user terminal responds to the first switch instruction, and displays an identifier corresponding to a first slave remote controller pre-added into a remote controller list; and the user terminal sends key value information of the first slave remote controller stored in a Database (DB) to the main remote controller through the forwarding device, whereby the main remote controller can refresh key value information of a key layout of the main remote controller according to the key value information of the first slave remote controller and conduct a remote control operation on a terminal device corresponding to the first slave remote controller.

A second aspect of the embodiments of the disclosure provides a user terminal, which includes the follows:

a receiving unit, configured to receive a first switch instruction sent by a main remote controller through a forwarding device;

a display unit, configured to respond to the first switch instruction, and display an identifier corresponding to a first slave remote controller pre-added into a remote controller list; and a sending unit, configured to send key value information of the first slave remote controller stored in a DB to the main remote controller through the forwarding device, whereby the main remote controller can refresh key value information of a key layout of the main remote controller according to the key value information of the first slave remote controller and conduct a remote control operation on a terminal device corresponding to the first slave remote controller.

A third aspect of the embodiments of the disclosure provides a remote control system for multiple terminal devices; the remote control system at least includes a user terminal, a main remote controller, and a forwarding device. In the remote control system:

The user terminal is configured to be connected with the forwarding device for communication through a Universal Serial BUS (USB) interface, and the forwarding device is configured to be connected with the main remote controller for communication through a wireless module;

the main remote controller is configured to receive a first switch instruction input by a user, and transmit the first switch instruction to the user terminal through the forwarding device;

the user terminal is configured to receive and respond to the first switch instruction, display an identifier corresponding to a first slave remote controller pre-added into a remote controller list, and send key value information of the first slave remote controller stored in a DB to the main remote controller through the forwarding device; and the main remote controller is further configured to receive the key value information of the first slave remote controller, and refresh key value information of own key layout according to the key value information of the first slave remote controller, so as to conduct a remote control operation on a terminal device corresponding to the first slave remote controller.

In the embodiments of the disclosure, the user terminal receives and responds to the first switch instruction sent by the main remote controller through the forwarding device, displays the identifier corresponding to the first slave remote controller added into the remote controller list in advance, and simultaneously sends the key value information of the first slave remote controller stored in the DB to the main remote controller through the forwarding device, such that the main remote controller can refresh the key value information of its own key layout according to the key value information of the first slave remote controller, thereby implementing the remote control operation over the terminal device corresponding to the first slave remote controller. By means of the embodiments of the disclosure, the user can simply and conveniently control and operate the multiple terminal devices through the main remote controller only by adding remote controller information of different devices into the user terminal and sending switch instructions to the user terminal through the main remote controller, without learning different remote controllers one by one.

In addition, by means of the embodiments of the disclosure, the user is not required to know about much related technical knowledge, and it is easy for the aged or children to master this remote control skill, so that this set of remote control system is favorably promoted and popularized.

BRIEF DESCRIPTION OF THE DRAWINGS

In order to describe the technical solutions of the embodiments of the disclosure or a conventional art more clearly, the drawings required by descriptions about the embodiments or the conventional art will be simply introduced below. Obviously, the drawings described below are only some embodiments of the disclosure, and those skilled in the art can also obtain other drawings according to these drawings without creative work.

DETAILED DESCRIPTION OF ILLUSTRATED EMBODIMENTS

The technical solutions in the embodiments of the disclosure will be clearly and completely described below with reference to the drawings in the embodiments of the disclosure. Obviously, the described embodiments are not all embodiments but only part of embodiments of the disclosure. All other embodiments obtained by those skilled in the art on the basis of the embodiments in the disclosure without creative work fall within the scope of protection of the disclosure.

The embodiments of the disclosure disclose a remote control method, related device, and system for multiple terminal devices, which can simply and conveniently control the multiple terminal devices through a remote controller. Detailed descriptions will be made below respectively.

Figure 1:
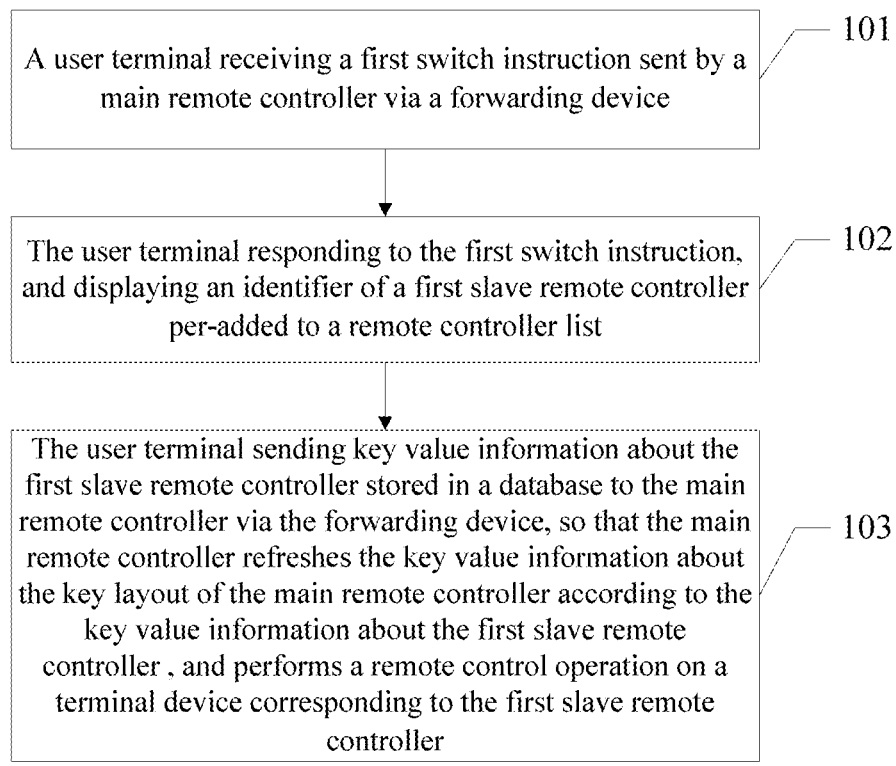
FIG. 1 is a flowchart of a remote control method for multiple terminal devices according to an embodiment of the disclosure.

Referring to FIG. 1, FIG. 1 is a flowchart of a remote control method for multiple terminal devices according to an embodiment of the disclosure. In the remote control method for multiple terminal devices described in FIG. 1, in order to implement remote control operations over the multiple terminal devices and provide a humanized graphical interaction interface, three types of devices are introduced in the embodiment of the disclosure, that is, a user terminal, a main remote controller, and a forwarding device. In the embodiment of the disclosure, the user terminal can be an intelligent television set with a system or a vehicle-mounted device, or can be an intelligent mobile phone or an Ipad, or can further be a personal computer and other intelligent devices, which will not be limited in the embodiment of the disclosure, and an operating system supported by the device includes Windows, Android, iOS and the like. The user terminal is also required to be integrated with an interface capable of implementing communication interaction with the forwarding device, such as a standard USB interface. The main remote controller not only has an infrared transmission and receiving function of an ordinary home appliance remote controller, but also is required to be integrated with a wireless module capable of communicating with the forwarding device, such as 2.4 GHz low-power-consumption Radio Frequency ("2.4G RF" for short), Wireless Fidelity (Wi-Fi), Bluetooth or other modules capable of implementing wireless data transmission. In addition to an interface (such as a USB interface) for communication interaction with the user terminal, the forwarding device is also required to have a wireless module for communication with the main remote controller. For example, the main remote controller and the forwarding device are both integrated with a 2.4G RF module respectively, so that the main remote controller can perform signal transmission with the forwarding device through the 2.4G RF module; or the main remote controller and the forwarding device can access the same local area network or home network through Wi-Fi, so that the main remote controller can perform signal transmission with the forwarding device through Wi-Fi.

As shown in FIG. 1, the remote control method for multiple terminal devices according to the embodiment of the disclosure can include the following steps.

101: the user terminal receives a first switch instruction sent by the main remote controller through the forwarding device.

In an embodiment, after the user terminal establishes a connection with the forwarding device through a standard USB interface and the forwarding device establishes a connection with the main remote controller through 2.4G RF, the main remote controller can send the first switch instruction to the forwarding device, such that the forwarding device can transmit the first switch instruction to the user terminal.

In an embodiment, the first switch instruction is configured to switch a terminal device currently remotely controlled by the main remote controller. For example, if the terminal device currently remotely controlled by the main remote controller is an air conditioner, when a user intends to change the remote control object of the remote master controller, it is only necessary to click a "switch" key on the main remote controller to send a switch instruction to the main remote controller, the main remote controller sends the instruction to the user terminal via the forwarding device, and then the user terminal responds to the instruction and executes a corresponding operation.

102: the user terminal responds to the first switch instruction, and displays an identifier corresponding to a first slave remote controller, among which the identifier is added into a remote controller list in advance.

In an embodiment, the user terminal responds to the first switch instruction, and simultaneously displays an icon and/or name of a terminal device corresponding to the first slave remote controller added into the remote controller list in advance in a fade-in and fade-out manner. Here, adoption of the fade-in and fade-out manner for display wants to prompt the user of a target switch terminal device without influence on an original operation of the user on the user terminal. For example, if a video is currently played on the user terminal, adoption of the fade-in and fade-out manner will not disturb the user to watch the video.

In the embodiment of the disclosure, the identifier corresponding to the first slave remote controller includes the name of the terminal device corresponding to the first slave remote controller and a model number of the terminal device corresponding to the first slave remote controller. In the remote controller list, the identifier corresponding to the first slave remote controller is listed or located immediately after an identifier of a slave remote controller corresponding to a terminal device remotely controlled by the main remote controller before the first switch instruction is sent.

103: the user terminal sends key value information of the first slave remote controller stored in a DB to the main remote controller through the forwarding device, whereby the main remote controller can refresh key value information of a key layout of the main remote controller according to the key value information of the first slave remote controller and perform a remote control operation on a terminal device corresponding to the first slave remote controller.

In the embodiment of the disclosure, the key value information of the first slave remote controller includes a code type and model number of the first slave remote controller and key value information corresponding to each key, and is pre-stored in the DB of the user terminal.

In an embodiment, the key value information of the first slave remote controller is sent to the forwarding device by the user terminal through the USB interface, and is transmitted to the main remote controller by the forwarding device through the 2.4G RF, and then the main remote controller maps a key layout of the first slave remote controller, so that the remote control operation can be performed on the terminal device corresponding to the first slave remote controller through the main remote controller.

For example, a television set is currently remotely controlled by the main remote controller, in the remote controller list of the user terminal, the next of a remote controller identifier representative of the television set corresponds to a remote controller identifier of an air conditioner, and after the main remote controller sends a switch instruction to the user terminal, the user terminal displays the identifier of the air conditioner in the fade-in and fade-out manner, and simultaneously sends key value information of the air conditioner to the main remote controller, and the main remote controller refreshes the key layout, and maps the same into a key layout of the air conditioner, so that the air conditioner can be remotely controlled through the main remote controller.

By implementing the method described in FIG. 1, the user can simply and conveniently control the multiple terminal devices through the main remote controller only by adding remote controller information of different devices into the user terminal and sending switch instructions to the user terminal through the main remote controller, without learning different remote controllers one by one.

Furthermore, by implementing the method described in FIG. 1, the user is not required to know about much related technical knowledge, and it is easy for the aged and children to master this remote control skill, so that this set of remote control system is favorably promoted and popularized.

Figure 2:
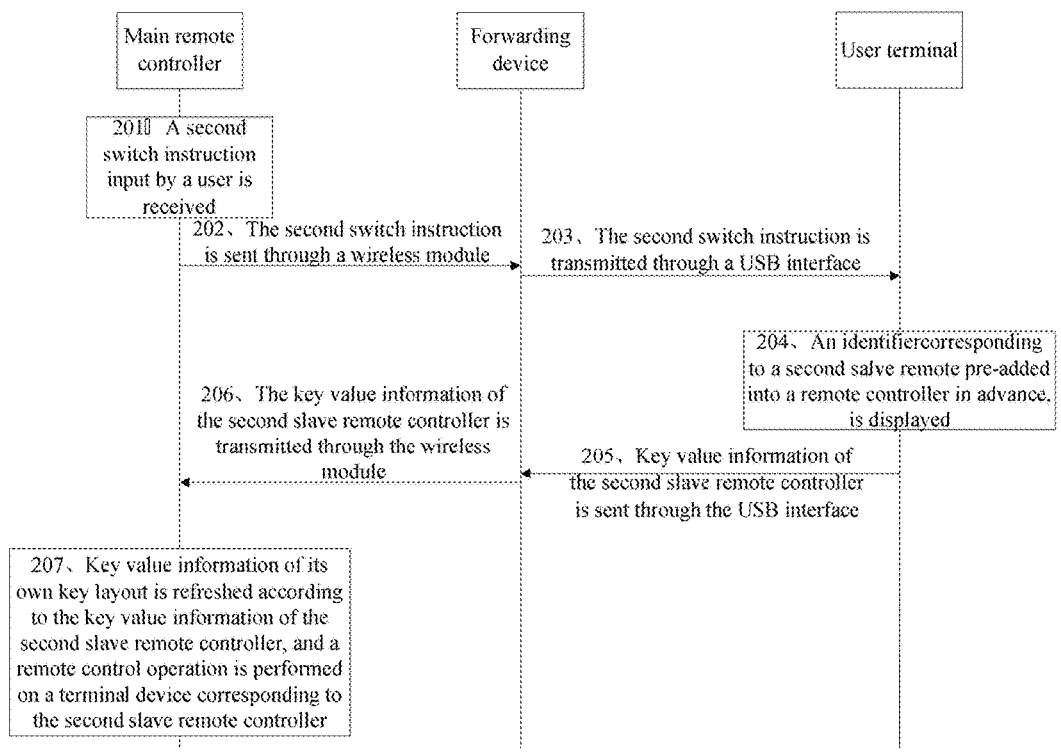
FIG. 2 is a flowchart of another remote control method for multiple terminal devices according to an embodiment of the disclosure.

Referring to FIG. 2, FIG. 2 is a flowchart of another remote control method for multiple terminal devices according to an embodiment of the disclosure. The remote control method for multiple terminal devices described in FIG. 2 is based on the remote control for multiple terminal devices described in FIG. 1, and if a key layout obtained after a main remote controller receives a first switch instruction input by a user is not what the user wants, the user is only required to input a switch instruction again until an expected key layout is obtained to remotely control a corresponding device. In the embodiment of the disclosure, the main remote controller is connected with a forwarding device for communication through a wireless module, and the wireless module can be 2.4G RF, Wi-Fi or Bluetooth and other modules capable of implementing wireless data transmission. In addition, the forwarding device is connected with a user terminal through a USB interface. As shown in FIG. 2, the remote control method for multiple terminal devices can include the following steps.

201: the main remote controller receives a second switch instruction input by the user.

The user clicks a "switch" key on the main remote controller again so as to send the second switch instruction to the main remote controller.

202: the main remote controller sends the second switch instruction to the forwarding device through the wireless module.

The process of step 202 is implemented on the premise that the main remote controller establishes a connection with the forwarding device through the wireless module, and the wireless module can be 2.4G RF, Wi-Fi or Bluetooth and other modules capable of implementing wireless data transmission.

203: the forwarding device transmits the second switch instruction to the user terminal through the USB interface.

The process of step 203 is implemented on the premise that the forwarding device is connected with the user terminal for communication through the USB interface.

204: the user terminal displays an identifier corresponding to a second slave remote controller, wherein the identifier is added into a remote controller list in advance.

The identifier corresponding to the second slave remote controller includes the name of a terminal device corresponding to the second slave remote controller and a model number of the terminal device corresponding to the second slave remote controller. The identifier of the second slave remote controller is at the next location of an identifier corresponding to a first slave remote controller in the remote controller list.

205: the user terminal sends key value information of the second slave remote controller to the forwarding device through the USB interface.

The key value information of the second slave remote controller includes a code type and model number of the second slave remote controller and key value information corresponding to each key, and the key value information is pre-stored in a DB of the user terminal.

206: the forwarding device transmits the key value information of the second slave remote controller to the main remote controller through the wireless module.

207: the main remote controller refreshes key value information of its own key layout according to the key value information of the second slave remote controller, and performs a remote control operation on a terminal device corresponding to the second slave remote controller.

In the embodiment of the disclosure, the user can click the "switch" key on the main remote controller for multiple times to switch to a remote controller key layout corresponding to a device that the user wants to remotely control, and each time of a switch, function mapping of the main remote controller is cyclically implemented by downward polling according to a sequence in the remote controller list of the user terminal and returning to the first location in the list when reaches the end of the list.

By implementing the method described in FIG. 2, the user can simply and conveniently control the multiple terminal devices through the main remote controller only by adding remote controller information of different devices into the user terminal and sending switch instructions to the user terminal through the main remote controller without learning different remote controllers one by one.

Furthermore, by implementing the method described in FIG. 2, the user is not required to know about much related technical knowledge, and it is very easy for the aged and children to master this remote control skill, so that this set of remote control system is favorably promoted and popularized.

Figure 3:
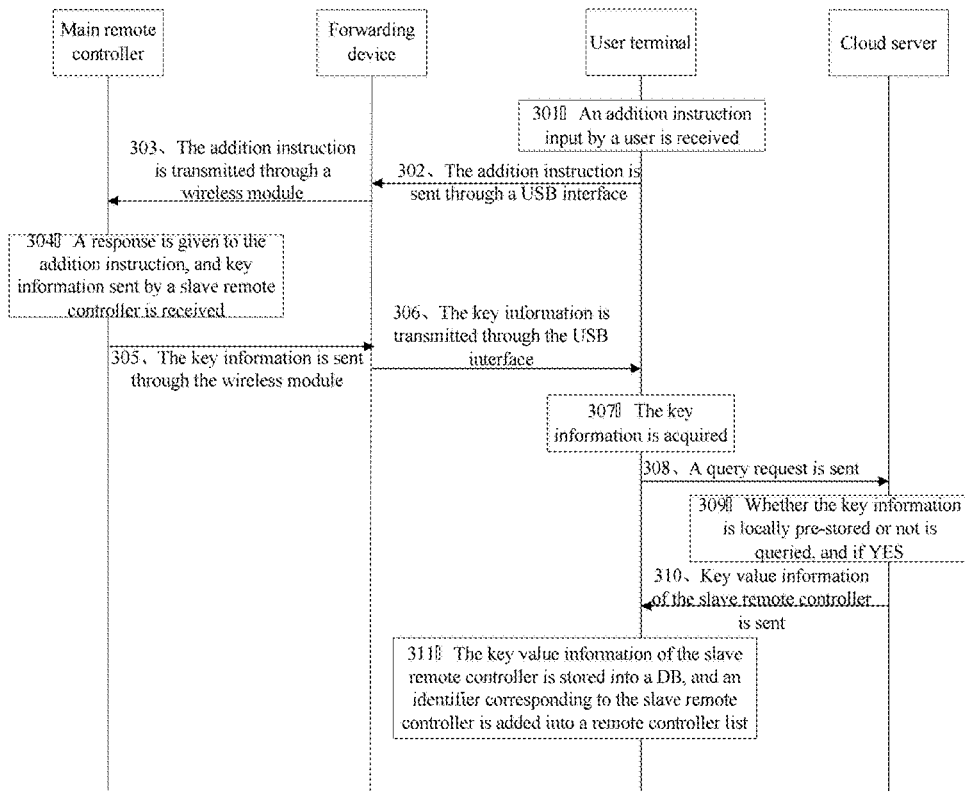
FIG. 3 is a flowchart of another remote control method for multiple terminal devices according to an embodiment of the disclosure.

Referring to FIG. 3, FIG. 3 is a flowchart of another remote control method for multiple terminal devices according to an embodiment of the disclosure. As shown in FIG. 3, the method includes the following steps.

301: a user terminal receives an addition instruction input by a user.

In the embodiment of the disclosure, the user clicks a "one-click add" option on an interactive interface of the user terminal to send the addition instruction to the user terminal. Step 301 is usually executed before Step 101, the user is required to add identifiers corresponding remote controllers in a family into a remote controller list of the user terminal when using this set of remote control system for the first time, and then the user can send switch instructions via a main remote controller to simply and conveniently change objects remotely controlled by the main remote controller.

302: the user terminal sends the addition instruction to a forwarding device through a USB interface.

Step 302 is implemented on the premise that the forwarding device is connected with the user terminal for communication through the USB interface.

303: the forwarding device transmits the addition instruction to the main remote controller through a wireless module.

Step 303 is implemented on the premise that the main remote controller establishes a connection with the forwarding device through the wireless module, and the wireless module can be 2.4G RF, Wi-Fi or Bluetooth or other modules capable of implementing wireless data transmission.

304: the main remote controller responds to the addition instruction, and receives key information sent by a slave remote controller.

In the embodiment of the disclosure, when the main remote controller receives the addition instruction, an infrared receiving module of the main remote controller is aligned with an infrared transmission module of the slave remote controller, the user is only required to press any key on the slave remote controller, and then the slave remote controller sends information of the key to the main remote controller. The key information includes an infrared code waveform of the key, that is, a level signal of the key.

305: the main remote controller sends the key information to the forwarding device through the wireless module.

306: the forwarding device transmits the key information to the user terminal through the USB interface.

307: the user terminal acquires the key information.

The user terminal is required to decode the key information to obtain an infrared code type and code value corresponding to the key information after acquiring the key information.

308: the user terminal sends a query request to a cloud server.

In the embodiment of the disclosure, the user terminal is connected with the cloud server for communication through the Internet, the query request includes the key information acquired and decoded in Step 307, and the query request is configured to request the cloud server for querying about whether the key information is pre-stored in the cloud server or not.

309: the cloud server queries about whether the key information is locally pre-stored or not, and if YES, proceed to Step 310.

Key value information of commercially available remote controllers of all known model numbers is pre-stored in the cloud server, and includes code types, model numbers and key information of each key of the remote controllers.

310: the cloud server sends key value information of the slave remote controller to the user terminal.

311: the user terminal stores the key value information of the slave remote controller in a DB, and adds an identifier corresponding to the slave remote controller into a remote controller list.

In an embodiment, if the key information is not found in the cloud server, the user terminal outputs prompt information in a view area, and the prompt information is configured to prompt the user that no remote controller information matched with the key information is found.

In the embodiment of the disclosure, the user terminal receives and responds to a software upgrade request sent by the cloud server, and upgrades and updates its own software version.

A background maintainer can update remote controller information on the cloud server every half year, and during this period, remote controllers of new types appearing on the market can be added in the cloud server for the user terminal to timely upgrade Application (APP) software, so as to conveniently control and operate devices.

By implementing the method described in FIG. 3, the user can simply and conveniently control the multiple terminal devices through the main remote controller only by acquiring remote controller information of different devices from the cloud server, adding it into the user terminal and sending switch instructions to the user terminal through the main remote controller without learning different remote controllers one by one.

Furthermore, by implementing the method described in FIG. 3, the user can intuitively know about a using method of a remote controller through a graphical interface, then the user is not required to know about much related technical knowledge, and it is very easy for the aged and children to master this remote control skill, so that this set of remote control system is favorably promoted and popularized.

Below are device embodiments of the disclosure, and the device embodiments are configured to execute the methods implemented by method embodiments one to three of the disclosure. For ease of description, only parts related to the embodiments of the disclosure are shown, and for specific undisclosed technical details, please refer to embodiment one, embodiment two, and embodiment three of the disclosure.

Figure 4:
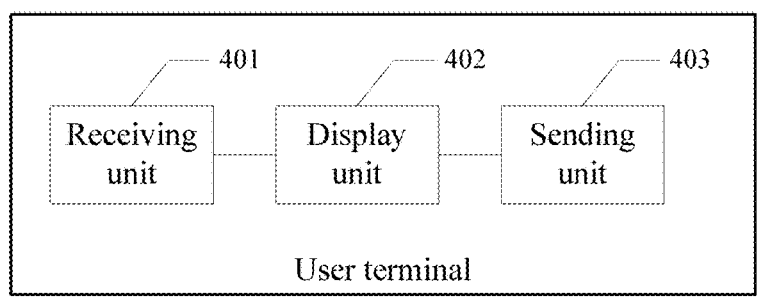
FIG. 4 is a structure diagram of a user terminal according to an embodiment of the disclosure.

Referring to FIG. 4, FIG. 4 is a structure diagram of a user terminal according to an embodiment of the disclosure. It is important to note that the user terminal shown in FIG. 4 of the disclosure can serve as an independent device configured to execute a remote control method for multiple terminal devices according to the embodiments of the disclosure, and can also serve as a newly added part of a device configured to execute the remote control method for multiple terminal devices according to the embodiments of the disclosure. The user terminal shown in FIG. 4 is required to establish a communication connection with a forwarding device (for example, the communication connection is established through a USB interface), and in addition, the forwarding device is also required to establish a communication connection with a main remote controller (for example, the communication connection is established through 2.4G RF or Wi-Fi or Bluetooth). As shown in FIG. 4, the user terminal according to the embodiment of the disclosure includes the follows.

A receiving unit 401, configured to receive a first switch instruction sent by the main remote controller through the forwarding device.

In an embodiment, the receiving unit 401 is specifically configured to receive the first switch instruction sent by the forwarding device through the USB interface, wherein the first switch instruction is a first switch instruction received by a wireless module of the forwarding device from the main remote controller.

In an embodiment, when a target remotely controlled device of the first switch instruction is not a device expected by the user, the unit 401 is further configured to receive a second switch instruction sent by the main remote controller through the forwarding device.

A display unit 402 is configured to respond to the first switch instruction, and display an identifier corresponding to a first slave remote controller, wherein the identifier is added into a remote controller list in advance.

In an embodiment, the user terminal displays an icon and/or name of a terminal device corresponding to the first slave remote controller added into the remote controller list in advance in a fade-in and fade-out manner. Here, adoption of the fade-in and fade-out manner for displaying wants to prompt the user of the target switch terminal device without influence on an original operation of the user on the user terminal. For example, if a video is currently played on the user terminal, adoption of the fade-in and fade-out manner will not disturb the user to watch the video.

In an embodiment, the unit 402 is further configured to respond to the second switch instruction, and display an identifier corresponding to a second slave remote controller, the identifier is added into the remote controller list in advance; in the remote controller list, the identifier corresponding to the second slave remote controller is listed below the identifier corresponding to the first slave remote controller.

A sending unit 403 is configured to send key value information of the first slave remote controller stored in a DB to the main remote controller through the forwarding device, whereby the main remote controller can refresh key value information of a key layout of the main remote controller according to the key value information of the first slave remote controller and perform a remote control operation on the terminal device corresponding to the first slave remote controller.

In the embodiment of the disclosure, the unit 403 is specifically configured to send the key value information of the first slave remote controller stored in the DB to the forwarding device through the USB interface, whereby the forwarding device can transmit the key value information of the first slave remote controller to the main remote controller through the wireless module.

In an embodiment, the unit 403 is further configured to send key value information of the second slave remote controller stored in the DB to the main remote controller through the forwarding device, whereby the main remote controller can refresh the key value information of the key layout of the main remote controller according to the key value information of the second slave remote controller and perform a remote control operation on a terminal device corresponding to the second slave remote controller.

With aid of the user terminal shown in FIG. 4, a user can simply and conveniently control the multiple terminal devices through the main remote controller only by adding remote controller information of different devices into the user terminal and sending switch instructions to the user terminal through the main remote controller without learning different remote controllers one by one.

Furthermore, with aid of the user terminal shown in FIG. 4, the user is not required to know about much related technical knowledge, and it is very easy for the aged and children to master this remote control skill, so that this set of remote control system is favorably promoted and popularized.

Figure 5:
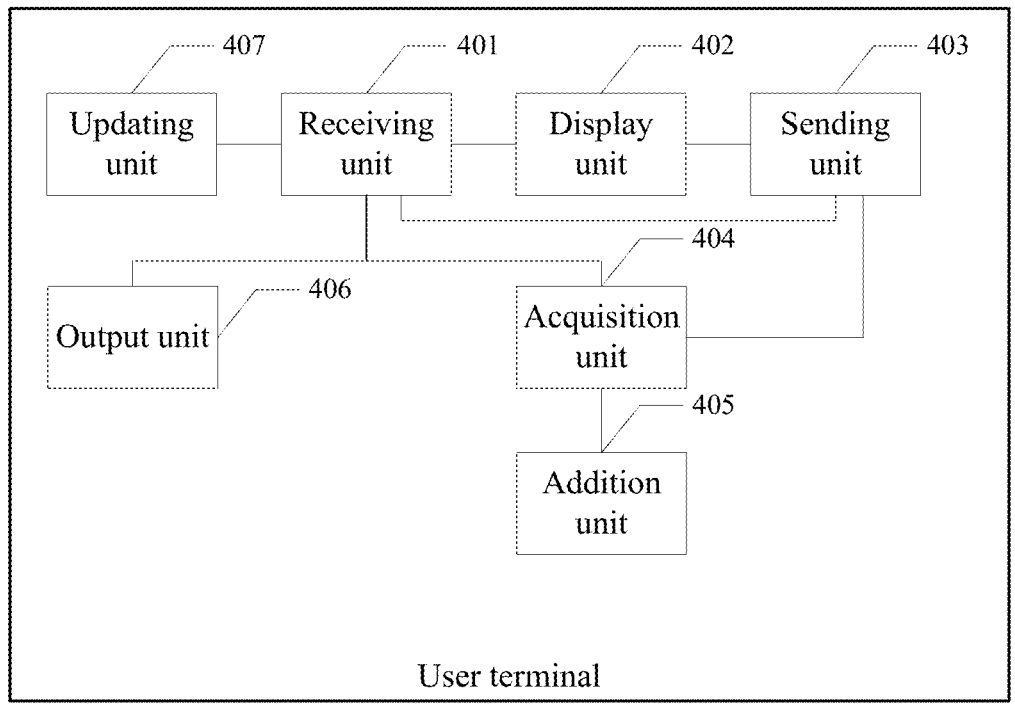
FIG. 5 is a structure diagram of another user terminal according to an embodiment of the disclosure.

Referring to FIG. 5 together, FIG. 5 is a structure diagram of another user terminal according to an embodiment of the disclosure, which is configured to implement the remote control method for multiple terminal devices according to the embodiments of the disclosure. Wherein, the user terminal shown in FIG. 5 is obtained by optimizing the user terminal shown in FIG. 4. In addition to the units included in the user terminal shown in FIG. 4, the user terminal shown in FIG. 5 can further include the follows.

An acquisition unit 404, configured to acquire key information transmitted by the main remote controller through the forwarding device.

The realization of the function of the unit 404 is on the premise that the receiving unit 401 receives an addition instruction input by the user before receiving the first switch instruction sent by the main remote controller through the forwarding device, and the addition instruction is sent to the main remote controller by sending unit 403 through the forwarding device, whereby the main remote controller can respond to the addition instruction, receive the key information sent by a slave remote controller, and send the key information to the unit 404 through the forwarding device.

The unit 404 is required to decode the key information to obtain an infrared code type and code value corresponding to the key information after acquiring the key information.

In the embodiment of the disclosure, the sending unit 403 is further configured to send a query request to a cloud server, whereby the cloud server can query about whether the key information is pre-stored in the cloud server or not, the query request including the key information.

In the embodiment of the disclosure, the receiving unit 401 is further configured to receive a query result sent by the cloud server.

The acquisition unit 404 is further configured to, when the query result received by the receiving unit 401 is YES, acquire key value information of the slave remote controller from the cloud server and store it in the DB.

An addition unit 405 is configured to, after the acquisition unit acquires and stores the key value information of the slave remote controller into the DB, add an identifier corresponding to the slave remote controller into the remote controller list.

An output unit 406 is configured to, when the query result received by the receiving unit 401 is NO, output a prompt message, the prompt message is configured to prompt the user that no remote controller information matched with the key information is found.

In the embodiment of the disclosure, the receiving unit 401 is further configured to receive a software upgrade request sent by the cloud server.

An updating unit 407 is configured to respond to the software upgrade request received by the receiving unit 401, and upgrade and update its own software version.

A background maintainer can update remote controller information on the cloud server every half year, and during this period, remote controllers of new types appearing on the market can be added in the cloud server for the user terminal to timely upgrade APP software, thereby conveniently controlling devices.

With aid of the user terminal shown in FIG. 5, the user can simply and conveniently control the multiple terminal devices through the main remote controller only by acquiring remote controller information of different devices from the cloud server, adding it into the user terminal, and sending switch instructions to the user terminal through the main remote controller, without learning different remote controllers one by one.

Furthermore, with aid of the user terminal shown in FIG. 5, the user can intuitively know about a using method of a remote controller through a graphical interface, then the user is not required to know about much related technical knowledge, and it is very easy for the aged and children to master this remote control skill, so that this set of remote control system is favorably promoted and popularized.

Figure 6:
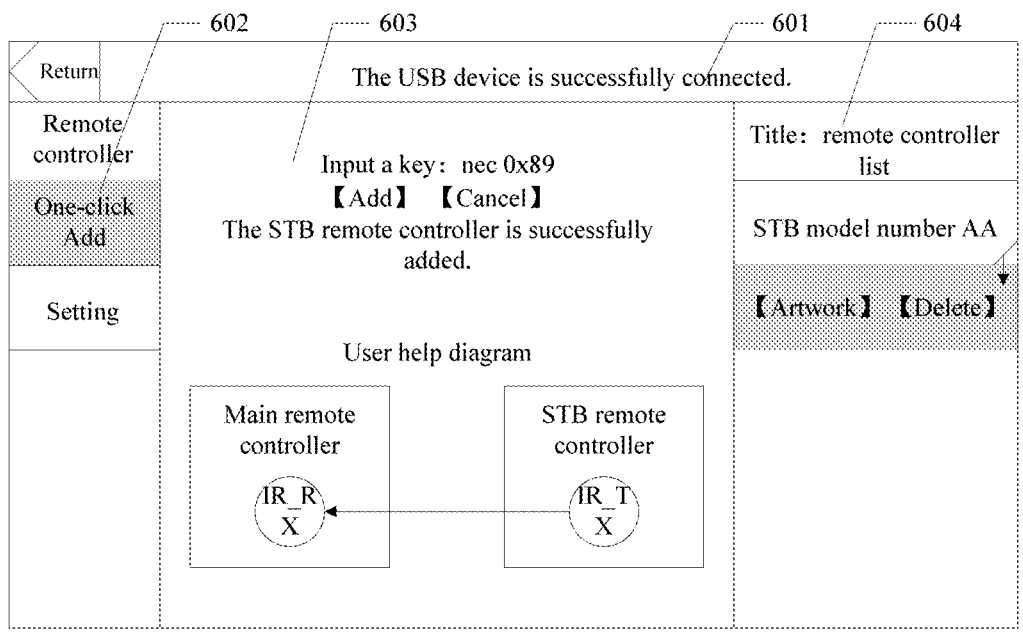
FIG. 6 is a schematic diagram of an operation interface of a user terminal according to an embodiment of the disclosure.

Referring to FIG. 6, FIG. 6 is a schematic diagram of an operation interface of a user terminal according to an embodiment of the disclosure. As shown in FIG. 6, the schematic diagram of the operation interface of the user terminal according to the embodiment of the disclosure can at least include the following areas.

An area 601 is configured to display whether the user terminal is successfully connected with a forwarding device through a USB interface or not to a user. "The USB device is successfully connected" is displayed in FIG. 6, and it is indicated that the user terminal is successfully connected with the forwarding device through the USB interface. If it is prompted in the area that no USB device is connected, it is indicated that the user terminal is not connected with the forwarding device through the USB interface, and at this moment, for remote control of multiple terminal devices, it is necessary to connect the user terminal with the forwarding device through the USB interface.

An area 602 is configured to make it convenient for the user to select an operation to be executed. The area includes three operations, that is, "remote controller", "one-click add", and "setting", which can be selected by the user.

In an embodiment, when the user clicks the option "one-click add", an addition instruction is sent to the user terminal, and at this moment, a user help diagram can appear in an area 603.

The area 603 is configured to help the user to better execute the operation. For example, when the user clicks the "one-click add" option, the user terminal sends the addition instruction to a main remote controller, and in this area, the user can be prompted to "input a key" and a user help diagram for aligning an infrared transmitter IR_TX of a slave remote controller (such as an STB remote controller) with an infrared receiver IR_RX of the main remote controller can be displayed. After alignment, the user is only required to press any key on the STB remote controller, the main remote controller receives key information through the IR_RX, and transmits the key information to the user terminal through the forwarding device, the user terminal initiates a query request for the key information to a cloud server, and the cloud server responds to the request, searches for whether the key information is pre-stored in the cloud server or not, and timely feeds back a query result to the user terminal. If no key information is found, a prompt message can be output in the area to prompt the user that no remote controller information matched with the key information is found. If found, the received key information can be displayed behind the displayed "input a press" in the area, the key information includes an infrared code type and a code value, and if the user clicks [Add], the user terminal can acquire key value information of the STB remote controller from the cloud server and stores it into a DB, "the STB remote controller is successfully added" can be displayed in the area, and meanwhile, an identifier corresponding to the ST remote controller can appear in an area 604. If the user clicks [Cancel], it is indicated that the user gives up acquiring the key value information of the STB remote controller.

The area 604 is a remote controller list configured to display the remote controller identifier which has been added.

For the same example, when the user clicks [Add] in the area 603, the user terminal acquires the key value information of the STB remote controller from the cloud server, and stores it into the DB, and then the identifier corresponding to the STB remote controller can be displayed in the area, the identifier including the name of a device corresponding to the remote controller and a model number of the terminal device corresponding to the remote controller. In addition, if a pull-down menu of the identifier of the remote controller is clicked, two options [Artwork] and [Delete] can appear, and if [Artwork] is clicked, a key layout of the STB remote controller can be displayed in the area 603, the key layout is consistent with a layout on the STB remote controller; and if [Delete] is clicked, the identifier of the STB remote controller can be deleted from the area.

By the schematic diagram of the operation interface of the user terminal shown in FIG. 6, the user can simply and conveniently control the multiple terminal devices through the main remote controller only by acquiring remote controller information of different devices from the cloud server, adding it into the user terminal and sending switch instructions to the user terminal through the main remote controller without learning different remote controllers one by one.

Furthermore, by the schematic diagram of the operation interface of the user terminal shown in FIG. 6, the user can intuitively know about a using method of a remote controller through a graphical interface, then the user is not required to know about much related technical knowledge, and it is very easy for the aged and children to master this remote control skill, so that this set of remote control system is favorably promoted and popularized.

Figure 7:
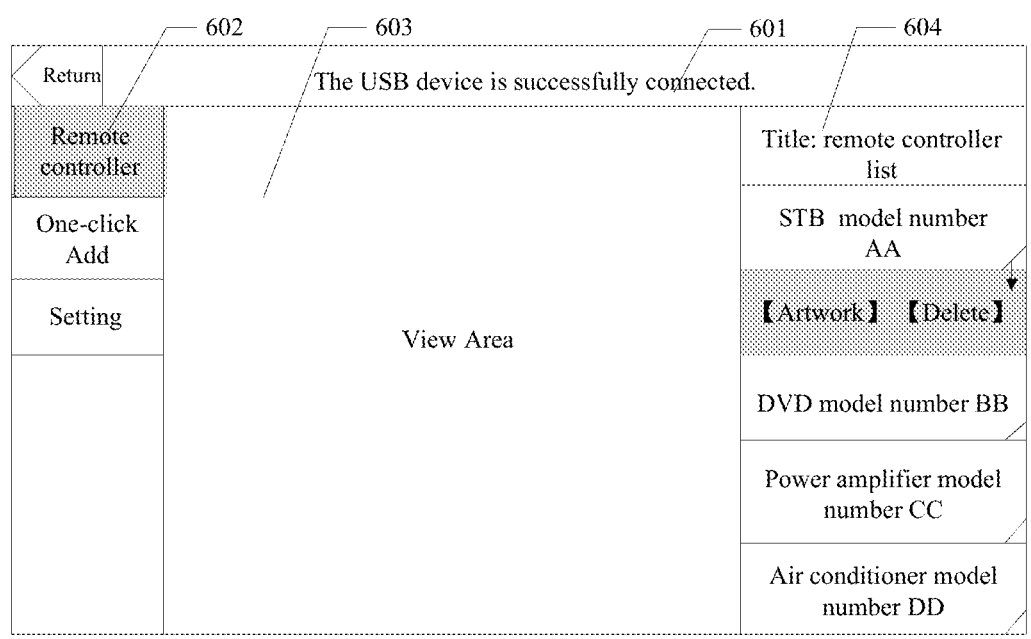
FIG. 7 is a schematic diagram of an operation interface of another user terminal according to an embodiment of the disclosure.

Referring to FIG. 7 together, FIG. 7 is a schematic diagram of an operation interface of another user terminal according to an embodiment of the disclosure. When the user clicks "one-click add" for many times to add identifiers corresponding to all remote controllers in a family into the user terminal, if the user clicks the "remote controller"

option in the area 602, all the remote controller identifiers which have been added can be displayed in the area 604.

For example, the user adds remote controller identifiers of an STB, DVD player, power amplifier, and air conditioner in the family into the user terminal by "one-click add", and when the user clicks "remote controller" in the area 602, the remote controller identifiers of the STB, the DVD player, the power amplifier, and the air conditioner are displayed in the area 604. Similarly, the user can click a pull-down menu of each remote controller identifier; a key layout of a corresponding remote controller can be displayed in the view area 603 if [Artwork] is selected, and the identifier of the remote controller is deleted from the remote controller list if [Delete] is selected.

By the schematic diagram of the operation interface of the user terminal shown in FIG. 7, the user can simply and conveniently control the multiple terminal devices through the main remote controller only by adding the identifiers corresponding to the remote controllers of different devices into the user terminal and sending switch instructions to the user terminal through the main remote controller without learning different remote controllers one by one.

Furthermore, by the schematic diagram of the operation interface of the user terminal shown in FIG. 7, the user can intuitively know about a using method of a remote controller through a graphical interface, then the user is not required to know about much related technical knowledge, and it is very easy for the aged and children to master this remote control skill, so that this set of remote control system is favorably promoted and popularized.

Figure 8:
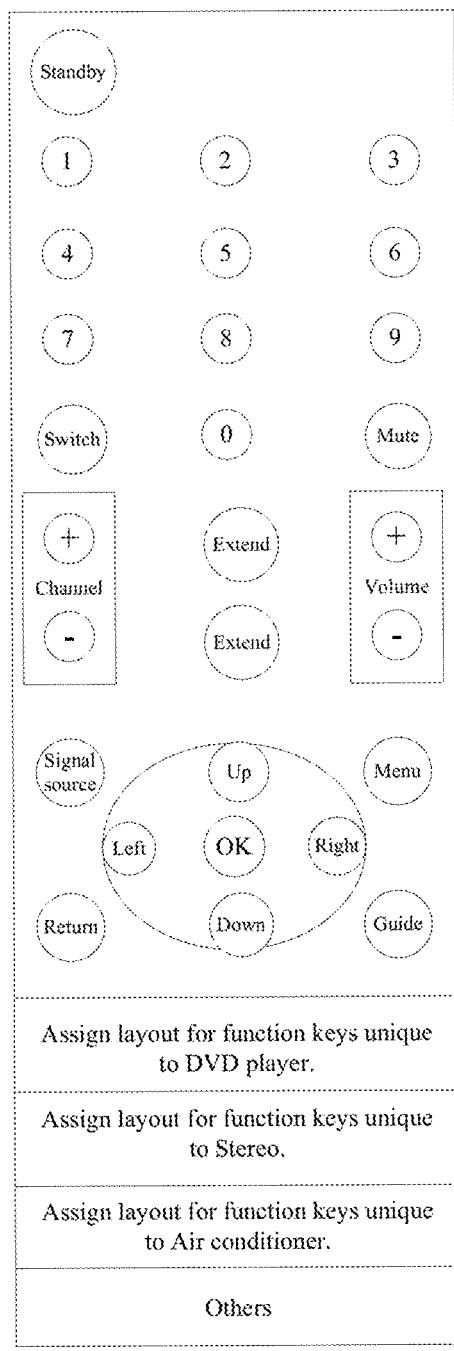
FIG. 8 is a structure diagram of a main remote controller configured to implement remote control over multiple terminal devices according to an embodiment of the disclosure.

Referring to FIG. 8, FIG. 8 is a structure diagram of a main remote controller configured to implement remote control over multiple terminal devices according to an embodiment of the disclosure. The main remote controller is extended on the basis of a key layout of an STB remote controller. Although the structure diagram of the main remote controller in FIG. 8 is given in the form of keys to represent functions of the main remote controller more intuitively, it can also be designed into the form of a layout of combining keys and a touch screen, or a form of pure touch screen in the embodiment of the disclosure, which will not be limited in the embodiment of the disclosure. As shown in FIG. 8, the main remote controller includes function keys (such as number keys 0-9, a channel +/− key, a volume +/− key and a mute key) of an ordinary STB remote controller, and further includes special keys configured to implement remote control over the multiple terminal devices, such as a switch key, an extend key, up, down, left and right guide keys, and keys independently set for some home appliances.

In the embodiment of the disclosure, a user sends a switch instruction to a user terminal through the "switch" key, so that the user terminal can display a target switching device to the user. The "extend" key can extend the functions of the main remote controller. For example, if the user wants to add an identifier of a certain remote controller to the user terminal, information of a certain key of the remote controller is sent to the user terminal through the main remote controller, the user terminal initiates a query request for the key information to a cloud server, the cloud server responds to the request, searches for whether the key information is pre-stored in the cloud server or not, and timely feeds back a query result to the user terminal; when the query result is NO, it is indicated that the information of the remote controller is not stored in the cloud server, and at this moment, the identifier of the remote controller is added when the cloud server is updated next time, or the user manually adds the information of the remote controller. If the user wants to manually add the information of the remote controller, the "extend" key has a remote controller learning function, a key layout of the main remote controller can be displayed on an operation interface of the user terminal, and the user is only required to add the remote controller to be added into a remote controller list of the user terminal by step-by-step learning according to prompts on the operation interface. In addition, some home appliances have unique functions, and based on such a consideration, keys are independently assigned to them on the main remote controller. For example: unique function keys are assigned to a DVD player, such as a fast forward key and a back key; unique function keys are assigned to a stereo, such as a sound effect key, a shuffle key and a pause key; and unique function keys are assigned to an air conditioner, such as a scavenging key and a mode key.

By the main remote controller configured to implement remote control over the multiple terminal devices shown in FIG. 8, the user can simply and conveniently control the multiple terminal devices through the main remote controller only by acquiring remote controller information of different devices from the cloud server, adding it into the user terminal and sending switch instructions to the user terminal through the main remote controller without learning different remote controllers one by one.

Furthermore, by the main remote controller configured to implement remote control over the multiple terminal devices shown in FIG. 8, the user can intuitively know about a using method of a remote controller through a graphical interface, then the user is not required to know about much related technical knowledge, and it is very easy for the aged and children to master this remote control skill, so that this set of remote control system is favorably promoted and popularized.

Figure 9:
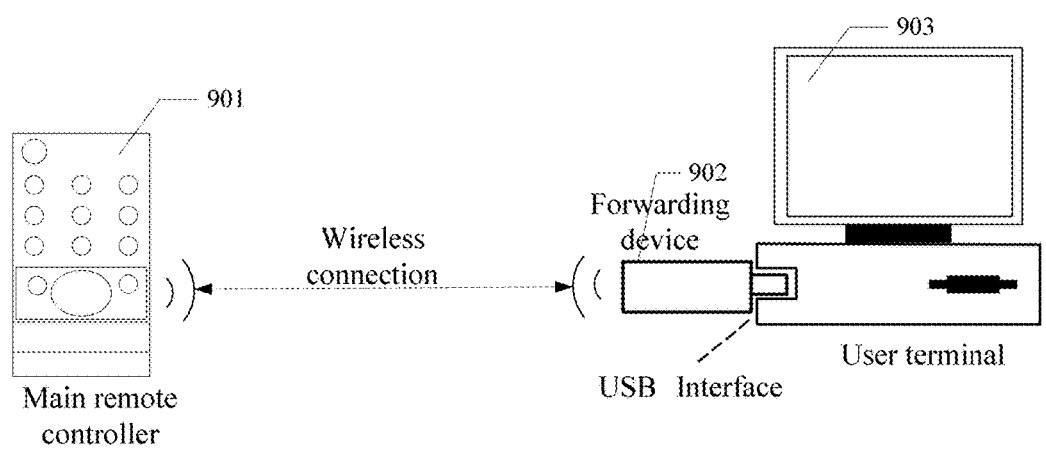
FIG. 9 is a structure diagram of a remote control system for multiple terminal devices according to an embodiment of the disclosure.

Referring to FIG. 9, FIG. 9 is a structure diagram of a remote control system for multiple terminal devices according to an embodiment of the disclosure, which is configured to execute a remote control method for multiple terminal devices according to the embodiments of the disclosure. As shown in FIG. 9, the remote control system for multiple terminal devices at least includes a main remote controller 901, a forwarding device 902, and a user terminal 903. In an implementation mode, the user terminal 903 can establish a communication connection with the forwarding device 902 through an interface (such as a USB interface), and the forwarding device 902 can establish a communication connection with the main remote controller 902 through a wireless module (such as 2.4G RF, Wi-Fi or Bluetooth).

The main remote controller 901 is configured to receive a first switch instruction input by a user, and transmit the first switch instruction to the user terminal 903 through the forwarding device 902.

The user terminal 903 is configured to receive and respond to the first switch instruction, display an identifier corresponding to a first slave remote controller, the identifier is added into a remote controller list in advance, and send key value information of the first slave remote controller stored in a DB to the main remote controller 901 through the forwarding device 902.

In the embodiment of the disclosure, the main remote controller 901 is further configured to receive the key value information of the first slave remote controller, and refresh key value information of its own key layout according to the key value information of the first slave remote controller, so as to perform a remote control operation on a terminal device corresponding to the first slave remote controller.

In an embodiment, when the target switching terminal device corresponding to the first slave remote controller is not a device the user wants to remotely control: the main remote controller 901 is further configured to receive a second switch instruction input by the user, and transmit the second switch instruction to the user terminal 903 through the forwarding device 902.

The user terminal 903 is further configured to receive and respond to the second switch instruction, display an identifier corresponding to a second slave remote controller, wherein the identifier is added into the remote controller list in advance; in the remote controller list, the identifier corresponding to the second slave remote controller is listed below the identifier corresponding to the first slave remote controller; the user terminal is further configured to send key value information of the second slave remote controller stored in the DB to the main remote controller 901 through the forwarding device 902.

Correspondingly, the main remote controller 901 is further configured to receive the key value information of the second slave remote controller, and refresh the key value information of its own key layout according to the key value information of the second slave remote controller, so as to perform a remote control operation on a terminal device corresponding to the second slave remote controller.

In an embodiment, according to the remote control system for multiple terminal devices shown in FIG. 9, the user terminal 903 is further configured to, before receiving the first switch instruction, receive an addition instruction input by the user, and send the addition instruction to the main remote controller 901 through the forwarding device 902.

Correspondingly, the main remote controller 901 is further configured to respond to the addition instruction, and receive key information sent by a slave remote controller.

Correspondingly, the user terminal 903 is further configured to acquire the key information transmitted by the main remote controller 901 through the forwarding device 902, send a query request to a cloud server for the cloud server to query about whether the key information is pre-stored in the cloud server or not, and receive a query result sent by the cloud server; if the query result is YES, the user terminal 903 is configured to acquire key value information of the slave remote controller from the cloud server, store it into the DB, and add an identifier corresponding to the slave remote controller into the remote controller list.

In an embodiment, according to the remote control system for multiple terminal devices shown in FIG. 9, the user terminal 903 is further configured to, when the query result is NO, output a prompt message, wherein the prompt message is configured to prompt the user that no remote controller information matched with the key information is found.

In an embodiment, the user terminal 903 is further configured to receive and respond to a software upgrade request sent by the cloud server, and upgrade and update own software version.

Wherein, by the remote control system for multiple terminal devices shown in FIG. 9, the user can simply and conveniently control the multiple terminal devices through the main remote controller only by acquiring remote controller information of different devices from the cloud server, adding it into the user terminal and sending switch instructions to the user terminal through the main remote controller without learning different remote controllers one by one.

Furthermore, by the remote control system for multiple terminal devices shown in FIG. 9, the user can intuitively know about a using method of a remote controller through a graphical interface, then the user is not required to know about much related technical knowledge, and it is very easy for the aged and children to master this remote control skill, so that this set of remote control system is favorably promoted and popularized.

Figure 10:
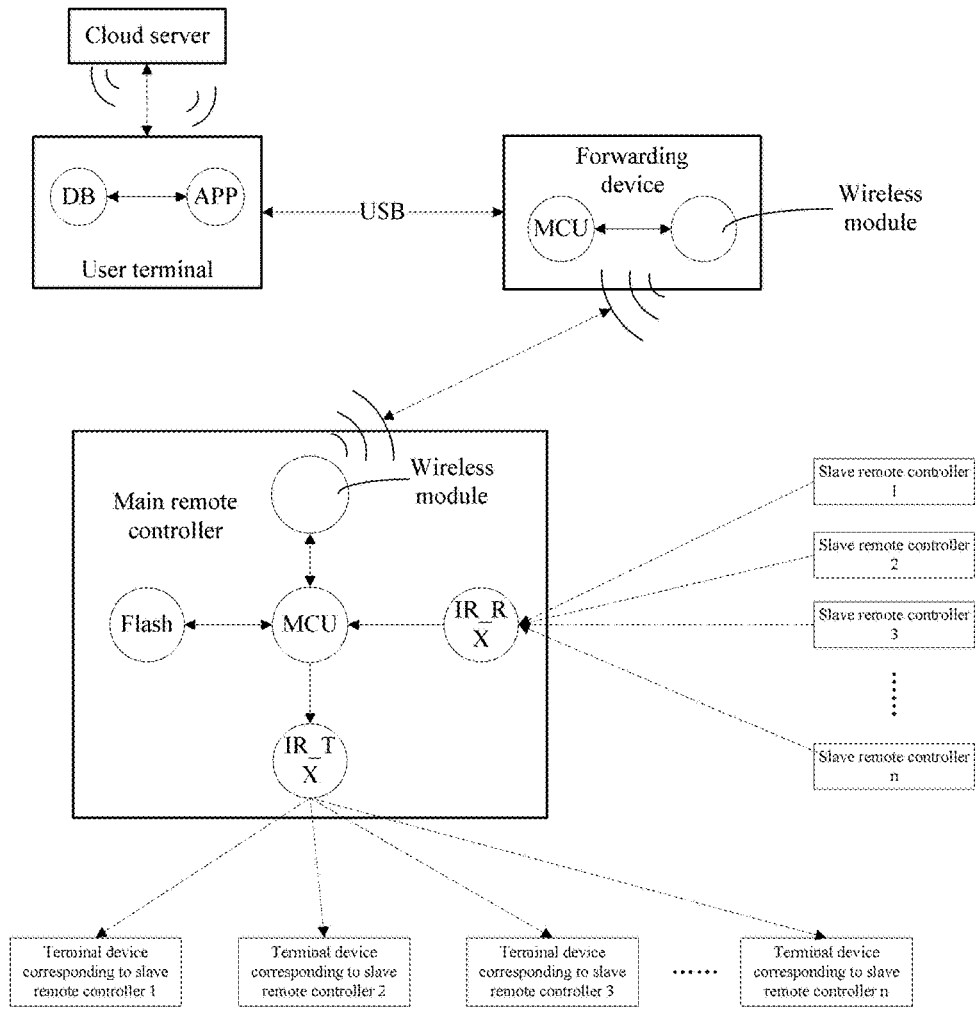
FIG. 10 is a structure diagram of another remote control system for multiple terminal devices according to an embodiment of the disclosure.

Referring to FIG. 10, FIG. 10 is a structure diagram of another remote control system for multiple terminal devices according to an embodiment of the disclosure, which is configured to execute a remote control method for multiple terminal devices according to the embodiments of the disclosure. As shown in FIG. 10, the remote control system for multiple terminal devices at least includes a main remote controller, a forwarding device, a user terminal, and a cloud server. Wherein, in an implementation mode, the user terminal can establish a communication connection with the cloud server via a wired/wireless network; the user terminal can establish a communication connection with the forwarding device through an interface (such as a USB interface), and the forwarding device can establish a communication connection with the main remote controller through a wireless module (such as 2.4G RF, Wi-Fi or Bluetooth).

The user terminal includes a DB and an APP, wherein the DB is configured to store key value information of all remote controllers added into the user terminal; and the APP runs to enable a user to perform various operations on a user operation interface generated by the APP, such as addition/deletion of a remote controller, querying about remote controllers included in a remote controller list, and other setting operations, and the APP can also run in background. The user terminal is required to be integrated with a communication interface (such as a USB interface) configured to communicate with the forwarding device.

The cloud server is configured to send a software upgrade request to the user terminal, the software upgrade request causing the user terminal to timely update its own APP software version. Once remote controllers of new types appear on the market, the cloud server timely updates remote controller information stored by its own without manual updating.

A background maintainer can update the remote controller information on the cloud server every half year, and during this period, the remote controllers of the new types appearing on the market can be added in the cloud server for the user terminal to timely upgrade the APP software, thereby conveniently controlling devices.

The forwarding device mainly includes a Micro Control Unit (MCU) and a wireless module.

The MCU is configured to store received information and transmit the information to the wireless module or a USB interface module, and plays a dominant role on the forwarding device.

The wireless module is configured to establish the communication connection between the forwarding device and the main remote controller, and it can be 2.4G RF, Wi-Fi or Bluetooth, or other modules capable of implementing wireless data transmission, the present disclosure is not limited thereto. The forwarding device is also required to be integrated with a communication interface (such as a USB interface) configured to communicate with the user terminal.

The main remote controller mainly includes an MCU, a wireless module, an infrared receiver IR_RX, an infrared transmitter IR_TX, and a Flash.

The MCU mainly plays a dominant control role on the main remote controller, and controls various operations of the main remote controller.

The wireless module in the main remote controller is required to correspond to the wireless module in the forwarding device. For example, if the wireless module in the forwarding device adopts 2.4G RF, the wireless module in the main remote controller is also required to adopt 2.4G RF; if the wireless module in the forwarding device adopts Wi-Fi, the wireless module in the main remote controller is also required to adopt Wi-Fi; and if the wireless module in the forwarding device adopts Bluetooth, the wireless module in the main remote controller is also required to adopt Bluetooth.

The IR_RX is configured to receive key information sent by a slave remote controller. For example, when the user terminal receives an addition instruction input by a user and sends the addition instruction to the main remote controller through the forwarding device, the main remote controller responds to the addition instruction, and at this moment, the user is required to align an infrared transmitter IR_TX of a slave remote controller 1 to be added with the IR_RX of the main remote controller, and when the user presses down any key on the slave remote controller 1, the IR_RX of the main remote controller receives key information sent by the IR_RX on the slave remote controller 1.

According to the remote control system for multiple terminal devices shown in FIG. 10, connection between the IR_RX of the main remote controller and the slave remote controller 1, a slave remote controller 2, a slave remote controller 3, . . . , a slave remote controller n with dotted lines indicates that only one piece of one-way communication is effective at a moment.

The IR-TX is configured to send the key information to a terminal device to control the terminal device to perform a corresponding operation. For example, the main remote controller sends a switch instruction to the user terminal through the forwarding device, the user terminal responds to the switch instruction, and switches to the next slave remote controller 2; the user terminal sends key value information of the slave remote controller 2 to the main remote controller through the forwarding device, such that the master controller can map a key layout of the slave remote controller 2, and at this moment, the user can press a key on the main remote controller to control a terminal device corresponding to the slave remote controller 2 to perform a corresponding operation only by aligning the main remote controller which has re-mapped the key layout with the terminal device corresponding to the slave remote controller 2.

According to the remote control system for multiple terminal devices shown in FIG. 10, connection between the IR_TX of the main remote controller and a terminal device corresponding to the slave remote controller 1, the terminal device corresponding to the slave remote controller 2, a terminal device corresponding to the slave remote controller 3, . . . , a terminal device corresponding to the slave remote controller n with dotted lines indicates that only one piece of one-way communication is effective at a moment.

The Flash is configured to record current key layout information of the main remote controller, and every time the main remote controller refreshes the key layout, contents in the Flash is correspondingly updated.

By means of the remote control system for multiple terminal devices shown in FIG. 10, the user can simply and conveniently control the multiple terminal devices through the main remote controller only by adding identifiers corresponding to remote controllers of different devices into the user terminal and sending switch instructions to the user terminal through the main remote controller without learning different remote controllers one by one.

Furthermore, by means of the remote control system for multiple terminal devices shown in FIG. 10, the user can intuitively know about a using method of a remote controller through a graphical interface, then the user is not required to know about much related technical knowledge, and it is very easy for the aged and children to master this remote control skill, so that this set of remote control system is favorably promoted and popularized.

It can be understood by those skilled in the art that all or part of the steps in each method of the abovementioned embodiments can be implemented by instructing related hardware through a program, the program can be stored in a computer-readable storage medium, and the storage medium can include: a flash disk, a Read-Only Memory (ROM), a Random Access Memory (RAM), a magnetic disk, an optical disk or the like.

The method, related device and remote control system for multiple terminal devices according to the embodiments of the disclosure are introduced above in detail, the principle and implementation modes of the disclosure are elaborated with specific examples in the disclosure, and the above description about the embodiments is only adopted to provide a help for understanding the method of the disclosure and a core concept thereof; and meanwhile, those skilled in the art can make variations to specific implementation modes and application scope according to the concept of the disclosure. To sum up, the content of the specification should not be understood as a limit to the disclosure.

What is claimed is:

1. A remote control method for multiple terminal devices, comprising:
   receiving, by a user terminal, a first switch instruction sent by a main remote controller through a forwarding device;
   responding to, by the user terminal, the first switch instruction, and displaying an identifier corresponding to a first slave remote controller pre-added into a remote controller list; and
   sending, by the user terminal, key value information of the first slave remote controller stored in a Database (DB) to the main remote controller through the forwarding device, whereby the main remote controller will refresh key value information of a key layout of the main remote controller according to the key value information of the first slave remote controller and conduct a remote control operation on a terminal device corresponding to the first slave remote controller.

2. The method of claim 1, wherein receiving, by the user terminal, the first switch instruction sent by the main remote controller through the forwarding device comprises:
   receiving, by the user terminal, the first switch instruction sent by the forwarding device through a Universal Serial BUS (USB) interface, wherein the first switch instruction is a first switch instruction received by a wireless module of the forwarding device from the main remote controller.

3. The method of claim 2, wherein sending, by the user terminal, the key value information of the first slave remote controller stored in the DB to the main remote controller through the forwarding device comprises:
   sending, by the user terminal, the key value information of the first slave remote controller stored in the DB to the forwarding device through the USB interface, whereby the forwarding device will transmit the key value information of the first slave remote controller to the main remote controller through the wireless module.

4. The method of claim 1, wherein the method further comprises:
   receiving, by the user terminal, a second switch instruction sent by the main remote controller through the forwarding device;
   responding to, by the user terminal, the second switch instruction, and displaying an identifier, added into the remote controller list, corresponding to a second slave remote controller; wherein in the remote controller list, the identifier corresponding to the second salve remote controller is listed below the identifier corresponding to the first slave remote controller; and
   sending, by the user terminal, key value information of the second slave remote controller stored in the DB to the main remote controller through the forwarding device, whereby the main remote controller will refresh the key value information of the key layout of the main remote controller according to the key value information of the second slave remote controller and conduct a remote control operation on a terminal device corresponding to the second slave remote controller.

5. The method of claim 1, wherein, before receiving, by the user terminal, the first switch instruction sent by the main remote controller through the forwarding device, the method further comprises:
   receiving, by the user terminal, an addition instruction input by a user;
   sending, by the user terminal, the addition instruction to the main remote controller through the forwarding device, whereby the main remote controller will respond to the addition instruction and receive key information sent by a slave remote controller;
   acquiring, by the user terminal, the key information transmitted by the main remote controller through the forwarding device;
   sending, by the user terminal, a query request to a cloud server, whereby the cloud server will query about whether the key information is pre-stored in the cloud server or not;
   receiving, by the user terminal, a query result sent by the cloud server; and
   if the query result is YES, acquiring, by the user terminal, key value information of the salve remote controller from the cloud server, storing the key value information into the DB, and adding an identifier corresponding to the salve remote controller into the remote controller list.

6. The method of claim 5, wherein the identifier corresponding to the slave remote controller comprises the name of a terminal device corresponding to the salve remote controller and a model number of the terminal device corresponding to the slave remote controller.

7. The method of claim 5, wherein the method further comprises:
   if the query result received by the user terminal from the cloud server is NO, outputting a prompt message, the prompt message being configured to prompt that no remote controller information matched with the key information is found.

8. The method of claim 5, wherein the method further comprises:
   receiving, by the user terminal, a software upgrade request sent by the cloud server; and
   responding to, by the user terminal, the software upgrade request, and upgrading and updating the software version of the user terminal.

9. A user terminal, comprising:
   a receiving unit, configured to receive a first switch instruction sent by a main remote controller through a forwarding device;
   a display unit, configured to respond to the first switch instruction, and display an identifier corresponding to a first slave remote controller pre-added into a remote controller list; and
   a sending unit, configured to send key value information of the first slave remote controller stored in a Database (DB) to the main remote controller through the forwarding device, whereby the main remote controller will refresh key value information of a key layout of the main remote controller according to the key value information of the first slave remote controller and conduct a remote control operation on a terminal device corresponding to the first slave remote controller.

10. The user terminal of claim 9, wherein the receiving unit is specifically configured to receive the first switch instruction sent by the forwarding device through a Universal Serial BUS (USB) interface, wherein the first switch instruction is a first switch instruction received by a wireless module of the forwarding device from the main remote controller.

11. The user terminal of claim 10, wherein the sending unit is specifically configured to send the key value information of the first slave remote controller stored in the DB to the forwarding device through the USB interface, whereby the forwarding device will transmit the key value information of the first slave remote controller to the main remote controller through the wireless module.

12. The user terminal of claim 9, wherein
   the receiving unit is further configured to receive a second switch instruction sent by the main remote controller through the forwarding device;
   the display unit is further configured to respond to the second switch instruction, and display an identifier, added into the remote controller list, corresponding to a second slave remote controller; wherein in the remote controller list, the identifier corresponding to the second salve remote controller is listed below the identifier corresponding to the first slave remote controller; and
   the sending unit is further configured to send key value information of the second slave remote controller stored in the DB to the main remote controller through the forwarding device, whereby the main remote controller will refresh the key value information of the key layout of the main remote controller according to the key value information of the second slave remote controller and conduct a remote control operation on a terminal device corresponding to the second slave remote controller.

13. The user terminal of claim 9, wherein
   the receiving unit is further configured to, before receiving the first switch instruction sent by the main remote controller through the forwarding device, receive an addition instruction input by a user;
   the sending unit is further configured to send the addition instruction to the main remote controller through the forwarding device, whereby the main remote controller will respond to the addition instruction and receive key information sent by a slave remote controller;
   the user terminal further comprises:
   an acquisition unit, configured to acquire the key information transmitted by the main remote controller through the forwarding device;

the sending unit is further configured to send a query request to a cloud server, whereby the cloud server will query about whether the key information acquired by the acquisition unit is pre-stored in the cloud server or not;

the receiving unit is further configured to receive a query result sent by the cloud server;

the acquisition unit is further configured to, when the query result received by the receiving unit is YES, acquire key value information of the salve remote controller from the cloud server, and store the key value information into the DB; and the user terminal further comprises:

an addition unit, configured to, after the acquisition unit acquires and stores the key value information of the slave remote controller into the DB, add an identifier corresponding to the salve remote controller into the remote controller list.

14. The user terminal of claim 13, wherein the user terminal further comprises:

an output unit, configured to, when the query result received by the receiving unit is NO, output a prompt message, wherein the prompt message is configured to prompt that no remote controller information matched with the key information is found.

15. The user terminal of claim 13, wherein the receiving unit is further configured to receive a software upgrade request sent by the cloud server; and the user terminal further comprises:

an updating unit, configured to respond to the software upgrade request, and upgrade and update the software version of the user terminal.

16. A remote control system for multiple terminal devices, at least comprising a user terminal, a main remote controller, and a forwarding device, wherein the user terminal is configured to be connected with the forwarding device for communication through a Universal Serial BUS (USB) interface, and the forwarding device is configured to be connected with the main remote controller for communication through a wireless module;

the main remote controller is configured to receive a first switch instruction input by a user, and transmit the first switch instruction to the user terminal through the forwarding device;

the user terminal is configured to receive and respond to the first switch instruction, display an identifier corresponding to a first slave remote controller pre-added into the remote controller list, and send key value information of the first slave remote controller stored in a Database (DB) to the main remote controller through the forwarding device; and the main remote controller is further configured to receive the key value information of the first slave remote controller, and refresh key value information of a key layout of the main remote controller according to the key value information of the first slave remote controller, so as to conduct a remote control operation on a terminal device corresponding to the first slave remote controller.

17. The system of claim 16, wherein the main remote controller is further configured to receive a second switch instruction input by the user, and transmit the second switch instruction to the user terminal through the forwarding device;

the user terminal is further configured to: receive and respond to the second switch instruction, display an identifier corresponding to a second slave remote controller pre-added into the remote controller list, wherein the identifier corresponding to the second slave remote controller in the remote controller list is listed below the identifier corresponding to the first slave remote controller; and send key value information of the second slave remote controller stored in the DB to the main remote controller through the forwarding device; and the main remote controller is further configured to receive the key value information of the second slave remote controller, and refresh the key value information of a key layout of the main remote controller according to the key value information of the second slave remote controller, so as to conduct a remote control operation on a terminal device corresponding to the second slave remote controller.

18. The system of claim 16, wherein the user terminal is further configured to, before receiving the first switch instruction, receive an addition instruction input by the user, and send the addition instruction to the main remote controller through the forwarding device;

the main remote controller is further configured to respond to the addition instruction, and receive key information sent by a slave remote controller; and the user terminal is further configured to acquire the key information transmitted by the main remote controller through the forwarding device, send a query request to a cloud server, whereby the cloud server will query about whether the key information is pre-stored in the cloud server or not; the user terminal is further configured to receive a query result sent by the cloud server, and if the query result is YES, acquire key value information of the slave remote controller from the cloud server, store the key value information into the DB, and add an identifier corresponding to the slave remote controller into the remote controller list.

19. The system of claim 18, wherein the user terminal is further configured to, when the query result received from the cloud server is NO, output a prompt message, wherein the prompt message is configured to prompt that no remote controller information matched with the key information is found.

20. The system of claim 18, wherein the user terminal is further configured to receive and respond to a software upgrade request sent by the cloud server, and upgrade and update the software version of the user terminal.

* * * * *